United States Patent

Kornylak

[15] 3,651,703
[45] Mar. 28, 1972

[54] BELT AND PULLEY POWER TRANSMISSION

[72] Inventor: Andrew T. Kornylak, 400 Heaton Street, Hamilton, Ohio 45011

[22] Filed: July 22, 1970

[21] Appl. No.: 57,062

[52] U.S. Cl. ................................................. 74/229
[51] Int. Cl. ........................................... F16h 7/02
[58] Field of Search ............................. 74/229, 214

[56] References Cited

UNITED STATES PATENTS 2,524,328  10/1950  Platt et al. ........................ 74/229 X

FOREIGN PATENTS OR APPLICATIONS 710,170  6/1931  France ............................. 74/229

Primary Examiner—Leonard H. Gerin
Attorney—Jay M. Cantor

[57] ABSTRACT

A belt and pulley power transmission for producing a more positive drive than that which can be obtained by smooth friction surfaces between belt and pulley. The pulley is roughened or provided with a coating or sleeve of flexible material and loops of beaded chains are positioned between the belt and pulley. The beads become indented in the flexible belt and embedded in the surface of the pulley to increase the tractive effort which can be transmitted over that of the customary smooth faces of pulley and belt. A guiding drum or bar guides the loops for travel in parallel planes and permits easy lateral adjustment of the belt.

14 Claims, 8 Drawing Figures

PATENTED MAR 28 1972
3,651,703
SHEET 1 OF 2
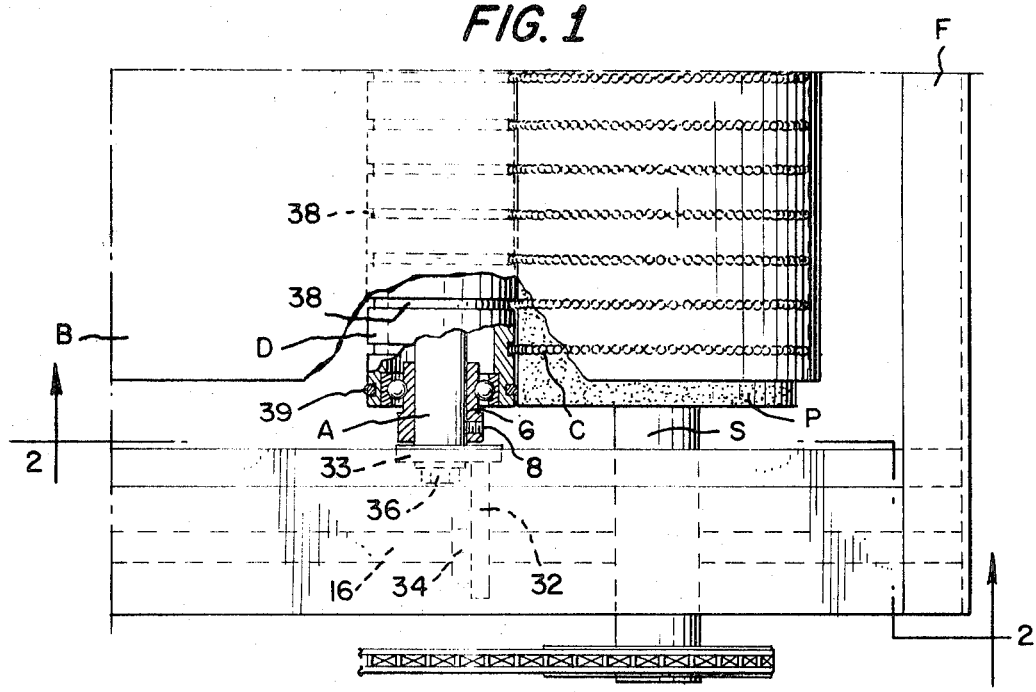
FIG. 1
FIG. 2
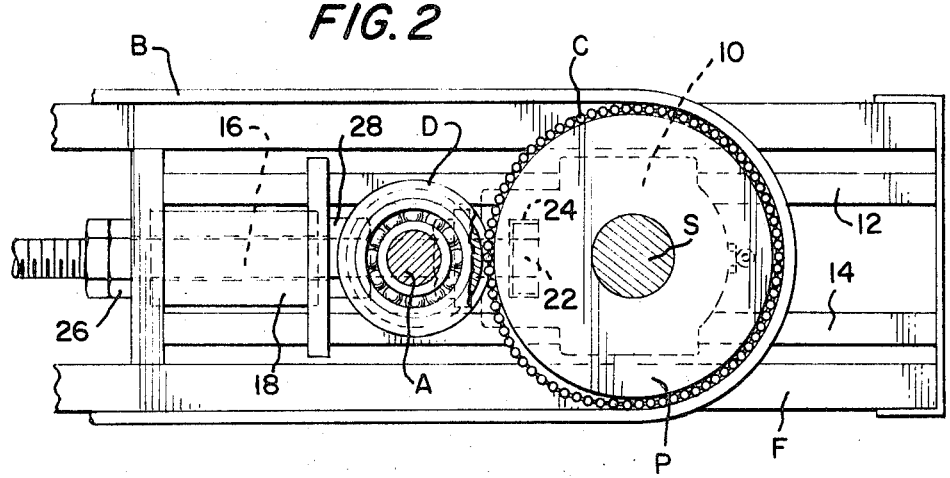
FIG. 6
INVENTOR
ANDREW T. KORNYLAK
BY Harold L. Halpert
AGENT

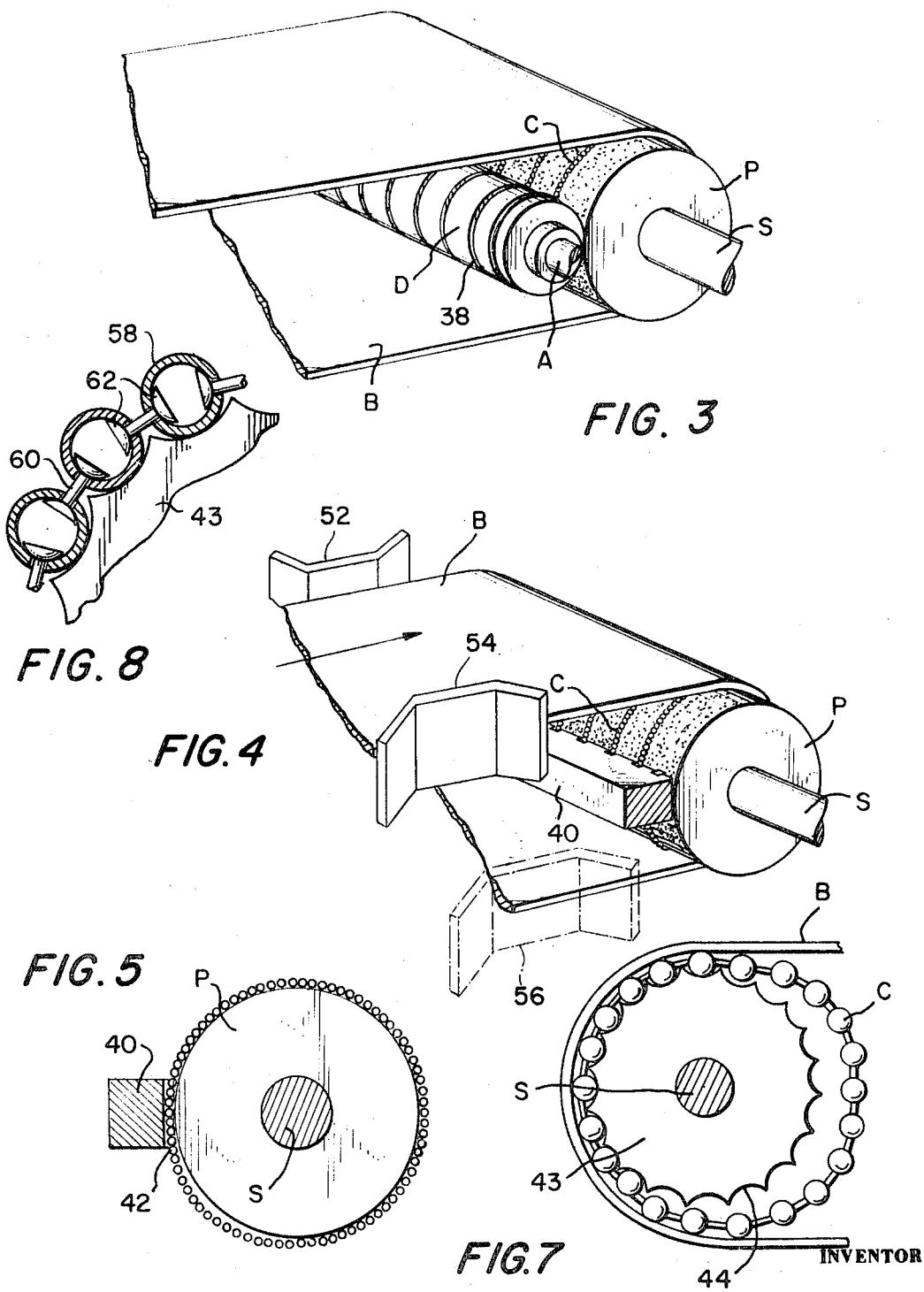

BELT AND PULLEY POWER TRANSMISSION

This invention relates to a belt and pulley drive and more particularly to a positive drive between the belt and pulley.

The customary belt and pulley used for the transmission of power depends upon the friction between the contacting surfaces of the belt and pulley and upon exact alignment of the crowned pulleys. The use of friction limits the driving power which can be transmitted and the crowned pulleys with the attendant alignment problems presents a maintenance burden which requires constant attention.

It is an object of this invention to provide a belt and pulley power transmission which reduces dependence on pure friction for driving effort.

It is a further object of this invention to provide a transmission as aforesaid which eliminates the necessity for crowned pulleys.

These and other objects of the invention will become manifest upon reading the following description in conjunction with the accompanying drawing wherein:

FIG. 1 discloses a segmental plan view, partly in section of the belt and pulley drive of this invention, FIG. 2 is a vertical view, partly in section, taken on the line 2—2 of FIG. 1, FIG. 3 is a perspective view of the invention illustrating one form of bead guide, FIG. 4 is a perspective view of the invention illustrating another form of bead guide, FIG. 5 is a vertical view, partly in section, showing the bead and guide of FIG. 4, FIG. 6 illustrates another modification of this invention, FIG. 7 is a view taken on the line 7—7 of FIG. 6, and FIG. 8 is a segmental view showing the position of the beads and flutes in one form of the invention.

In accordance with this invention a pulley is formed with a roughened or resilient surface. A beaded chain is mounted on the pulley between the belt and pulley surface and a guide is mounted adjacent the pulley to direct the chain.

With reference to FIG. 1 there is disclosed a pulley P having a rough surface formed by etching, sand blasting, machining, or forging, for example. Beaded chains C having a length greater than the circumference of the pulley, are loosely looped around the pulley in parallel loops. Each chain loop is formed by stringing spherical beads over a flexible cable or by connecting hollow beads by bone shaped links as is well known.

The pulley is rotatably mounted in a frame F by a shaft S and is connected in power transmitting relation to a sprocket and chain 2,4. A guide in the form of a drum D is rotatably mounted on an axle A by means of antifriction bearings 6 secured to the ends of the axle by a screw key threaded through opening 8 in the inner race of the bearing.

The shaft S is carried by bearings 10 at each end. Each bearing is slidably carried by rails 12, 14 extending through openings in the bearing. A rod 16 is slidable carried in a support 18 carried by a member 20 welded to the frame. The rod extends through an opening 21 in the bearing and is provided with a head 22 secured thereto as by a pin. The head is positioned in an opening 24 in the bearing. The rod is threaded to receive nuts 26, 28 which engage opposite ends of the support. The nuts can be threaded to position the shaft along the frame to provide proper tension for the belt B.

The axle A is mounted in support plates 30 carried at each end of the axle by an arm 32. The rod 16 extends through an opening in the arm and is threaded to receive a nut 34. The plate 30 is secured to the axle by a nut 36. Threading the nuts 34 on the threaded portion of rod 16 will position the drum relative to the surface of the pulley.

The drum is formed with parallel grooves 38 of a width to allow the beaded chains to pass freely but sufficiently narrow to engage the sides of the beads to guide the beads for travel in parallel planes. The ends of the roller are formed with grooves which support tires 39 which engage the pulley and drive the drum.

In FIG. 4 there is disclosed a modified form of invention in which the guide is in the form of a non-rotatable but adjustable bar 40 provided with grooves 42 to guide the chains. The bar is preferably made of Nylon.

In all forms of the invention I provide lateral guides for the belt to set the belt in proper position. The guides comprise rails 52 and 54, as diagrammatically illustrated in FIG. 4, which bear against the sides of the belt. Another set of guides 56 are used when the belt is to be run in the forward and reverse directions. The rolling contact of the beads between the belt and pulley permits easy lateral adjustment of the belt position by the guides and maintains the belt in accurate alignment with the pulley.

In FIG. 6 there is shown a form of the invention wherein the roughened pulley is in the form of a fluted shaft 43. The beads are of a size to be consonant with the flutes 44.

In FIG. 8 there is illustrated a form of the invention in which the loops are formed of beads of hollow spheres 58 interconnected by bone shaped links 60. The pitch of the flutes and length between the heads 62 is such as to permit the beads to shift freely to conform with the flutes and avoid contact with the heads. The frictional forces are thus reduced to a minimum.

When the pulley is formed with a resilient surface the beads become indented in the resilient material as well as in the belt to form a more positive drive than that obtainable by friction alone.

While I have disclosed several modes for forming the roughness on the pulley it is to be understood that the degree of roughness can be selected for various types of operation.

I claim:

1. A power transmission comprising a pulley, a belt trained about the pulley, and means mounted around the pulley and between the belt and pulley for transmitting power between the belt and pulley, said means providing rolling contact therebetween for relative shifting movement of the belt and pulley axially of the pulley under the influence of a lateral force directed against one of them.

2. A power transmission as defined in claim 1 in which the means mounted around the pulley comprises at least one loop of beads having rounded surfaces.

3. A power transmission as defined in claim 2 wherein the surface of the pulley is resilient.

4. A power transmission as defined in claim 3 wherein the means mounted around the pulley comprises a loop of beaded chain.

5. A power transmission as defined in claim 2 in which the loop of beads is comprised of a flexible cable having a plurality of beads strung thereon.

6. A power transmission as defined in claim 2 in which the loop of beads is comprised of a plurality of hollow beads diametrically interconnected by cylindrical links having enlarged heads within the beads.

7. A power transmission as defined in claim 1 including guides stationed at the edges of the belt for imparting the necessary lateral force to maintain the belt in alignment with the pulley.

8. A power transmission comprising a pulley, a belt trained about the pulley, and means mounted around the pulley and between the belt and pulley for transmitting power between the belt and pulley, wherein the surface of the pulley is roughened.

9. A power transmission as defined in claim 8 wherein the means mounted around the pulley comprises a loop of beaded chain.

10. A power transmission as defined in claim 8 wherein the means mounted around the pulley comprises parallel loops of beaded chains and means guiding the loops for rotation in parallel plains.

11. A power transmission as defined in claim 10 wherein the guiding means for the loops comprises a drum mounted for rotation about an axis parallel to the axis of the pulley, and a plurality of parallel grooves formed in the periphery of the drum embracing the sides of the chains.

12. A power transmission as defined in claim 10 wherein the guiding means for the loops comprises a bar mounted adjacent the surface of the pulley and a plurality of parallel grooves formed in the surface adjacent the drum embracing the sides of the pulley.

13. A power transmission as defined in claim 10 wherein the rough surface comprises flutes parallel to the axis of the pulley.

14. A power transmission as defined in claim 8 wherein the rough surface of the pulley is etched.

* * * * *